O. A. MYGATT.
GLASSWARE.
APPLICATION FILED JUNE 26, 1907.

967,029.

Patented Aug. 9, 1910.
2 SHEETS—SHEET 1.

WITNESSES
Chas. K. Davies.
David Oettinger

INVENTOR
Otis A. Mygatt
by Bartlett & Brock
Attorneys

O. A. MYGATT.
GLASSWARE.
APPLICATION FILED JUNE 26, 1907.

967,029.

Patented Aug. 9, 1910.
2 SHEETS—SHEET 2.

WITNESSES
Chas. K. Davis.
David Oettinger

INVENTOR
Otis A. Mygatt
by Bartlett & Brock
Attorneys

UNITED STATES PATENT OFFICE.

OTIS A. MYGATT, OF NEW YORK, N. Y.

GLASSWARE.

967,029.  Specification of Letters Patent.  Patented Aug. 9, 1910.

Application filed June 26, 1907. Serial No. 380,933.

*To all whom it may concern:*

Be it known that I, OTIS A. MYGATT, a citizen of the United States, and resident of the city and State of New York, have invented certain new and useful Improvements in Glassware, of which the following is a specification.

My present invention is for producing transparent glassware having designs pressed or cut on both surfaces which will give a more sparkling or brilliant appearance to the glass than glassware as now manufactured.

The present method of putting designs formed of corrugations on transparent glass structures is to press or cut the particular design on one surface of the glass, such corrugations generally having prismatic outlines, the opposite surfaces of the glass structure being left smooth. When such designs are carried out in cut glass the glass article has more richness and brilliancy than the pressed glass, not because it embodies any different optical law from the pressed glass design, but simply because the cut glass article has more perfectly polished surfaces and is generally composed of a better quality of glass. All glass structures, however, having prismatic designs cut or pressed on one surface of the glass only, have a certain fixed or dead effect either when seen through the opposite smooth surface, or when viewed from the side on which the designs are cut or pressed.

Figure 1:
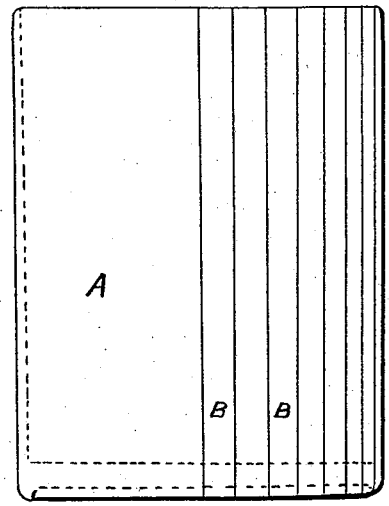
Figure 3:
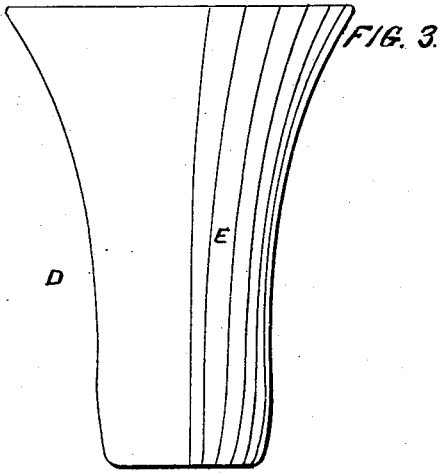
Figure 2:
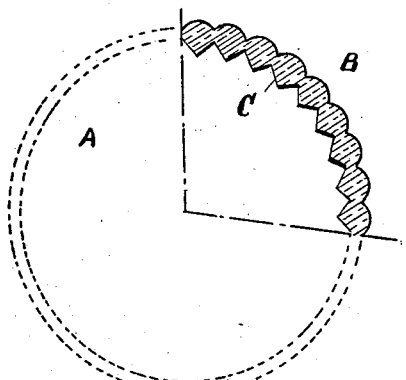
Figure 5:
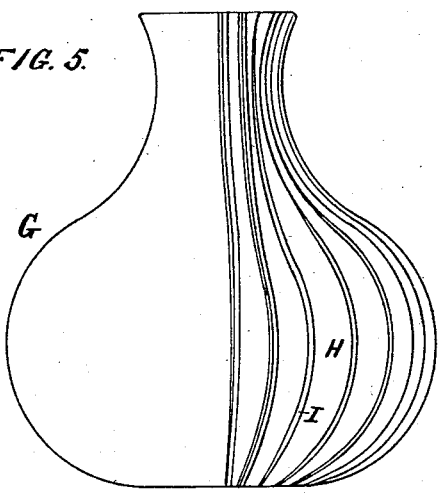
Figure 4:
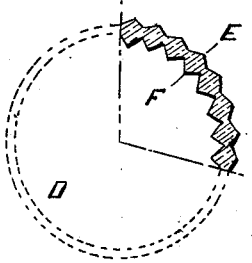
Figure 6:
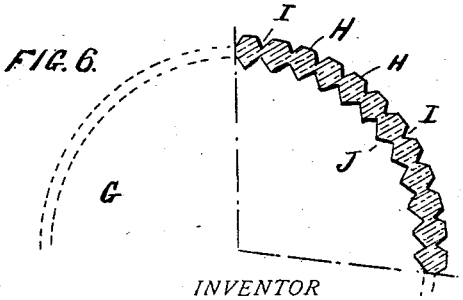
Figure 7:
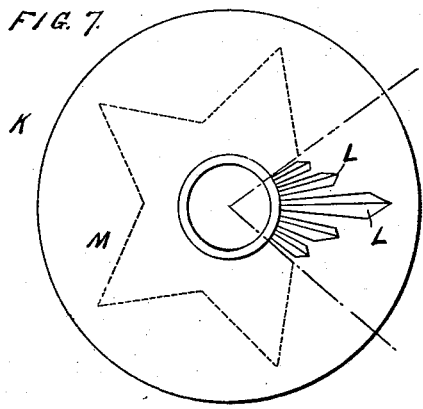
Figure 9:
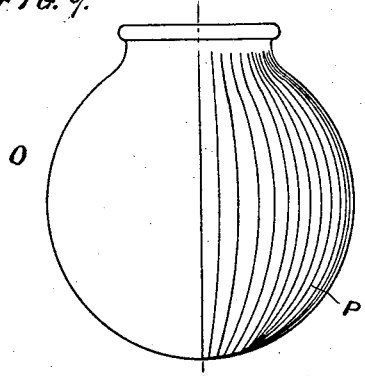
Figure 8:
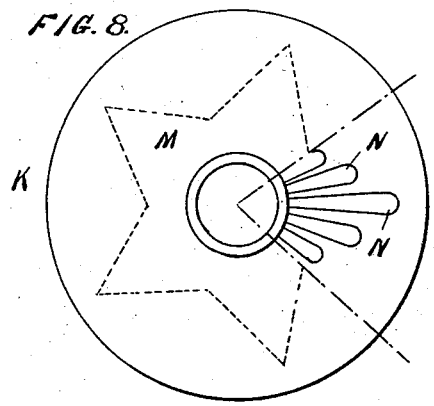
Figure 10:
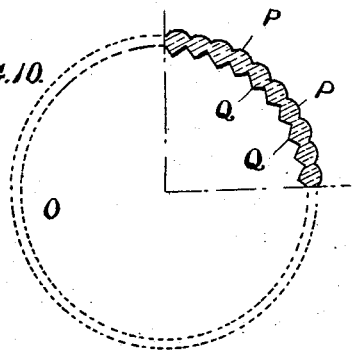
Figure 11:
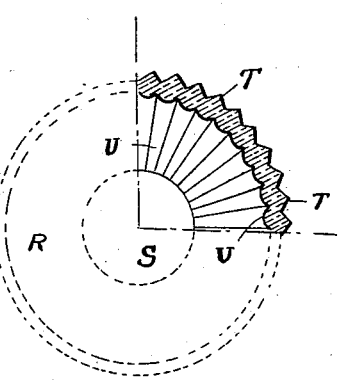

Figure 1 represents a side elevation of a tumbler embodying my invention and Fig. 2 a section of a segment of the same. Fig. 3 is a side elevation of a vase showing my invention, and Fig. 4, a section of a segment of the same. Fig. 5 represents a side elevation of a decanter showing my improvement, and Fig. 6, a section of a segment of the same. Figs. 7 and 8 represent, respectively, the obverse and reverse of a reflector embodying my invention. Figs. 9 and 10 represent, respectively, a side elevation and section of a segment of a shade to which my invention has been applied. Fig. 11 is a section of a segment of a reflector embodying the invention.

The object of my present invention is to take away this fixed or dead effect and give such designs a richer and more brilliant appearance. This I accomplish by what I call "paralleling" the design pressed or cut on one side of the glass structure by lines on the other side following the same directions as the outlines forming the design on the first-mentioned surface of the glass. For instance, whatever design is pressed or cut on one surface of the glass structure will as a rule be composed of numerous lines or corrugations of symmetrical prismatic outline. Such designs when viewed through the opposite smooth surface of the glass have generally a silvery appearance, which is the result of light rays passing through the smooth surface being reflected back again by the prismatic designs on the opposite side. Prismatic corrugations or designs of respective symmetry when viewed from the side of the glass on which they are put, whether by pressing or cutting, are not as brilliant as when viewed through the opposite smooth surface of the glass.

My present method of making designs or prismatic corrugations pressed or cut on the surface of transparent glass structures appear more brilliant and sparkling both by transmitted and reflected light, is the following: Whatever design is pressed or cut on one surface of the glass is paralleled on the opposite, as at present made smooth, surface of the glass by corresponding lines of corrugations following the same directions as those pressed or cut on the opposite surface of the glass. Where it is desired that the glassware should give the best effects by reflected light, these paralleling lines of corrugations have preferably a rounded outline. (See for example Fig. 1.) Where such glassware is intended to give more sparkling and brilliant effects by transmitted light, the lines of corrugations placed on the generally smooth surface of the glass structure and following the lines and corrugations on the opposite surface, are made of prismatic outline. (See Figs. 3 and 4, for example.)

In Fig. 7, I illustrate a star composed of prismatic corrugations used for decorative purposes, as generally made on the under side of the bottom of a transparent glass plate for example. Such a design will be generally viewed from the inner, smooth surface of the plate, and will have a more or less silvery appearance when so viewed. My method is to put on this generally smooth surface corrugations, preferably in the present case of curved outlines following the same directions as the prismatic star design on the opposite surface, and placed exactly opposite such design, generally in the way that a reflection faces a design placed close against a mirror's face. (See Fig. 8.) The result of these corrugations paralleling the prismatic surfaces on the opposite side of the glass is to give a more finished or polished and more brilliant appearance to the prismatic star which it does not possess when the prismatic decoration is limited to one side of the glass structure and the other side is left smooth. If I wish to make the prismatic star in question appear more brilliant when viewed by transmitted light, I prefer to make the corrugations paralleling the prismatic star design of prismatic outline.

Where artificial light inclosures are made according to my present application, the corrugations on both sides will lie in generally longitudinal or radial directions; the best light effects being obtained when the corrugations on both sides of a globe or reflector lie in planes common to the axis of the glass structure.

In shades intended for light transmission I prefer to use prismatic corrugations on the inside and curved corrugations on the outside. (See Fig. 9.) In reflectors I prefer to use prismatic corrugations on the outside and curved corrugations on the inside (Fig. 11); but innumerable modifications and prismatic combinations may be used.

By the word "symmetry" or the words "respective symmetry" as used in the specification and claims is meant an angular projection in which there is a metrical correspondence of parts with respect to a median plane, each element of the geometrical form having its counterpart upon the opposite side of that plane and at the same distance from it.

Having described my invention, what I claim is:

1. Glassware having upon one side a design comprising angular projections of respective symmetry substantially exactly opposite to and paralleling a similar design through the thickness of the glass.

2. Glassware having upon one side a design comprising angular projections of respective symmetry substantially exactly opposite to and paralleling prismatic ribs through the thickness of the glass.

3. Glassware having upon one side a design comprising radial angular projections of respective symmetry substantially exactly opposite to and paralleling a similar design through the thickness of the glass.

4. Glassware having upon one side a design comprising radial angular projections of respective symmetry substantially exactly opposite to and paralleling prismatic ribs through the thickness of the glass.

5. A glass inclosure having upon one side a design comprising angular projections of respective symmetry substantially exactly opposite to and paralleling a similar design through the thickness of the glass.

6. A glass inclosure having upon one side a design comprising angular projections of respective symmetry substantially exactly opposite to and paralleling prismatic ribs through the thickness of the glass.

7. A glass inclosure having upon one side a design comprising radial angular projections of respective symmetry substantially exactly opposite to and paralleling a similar design through the thickness of the glass.

8. A glass inclosure having upon one side a design comprising radial angular projections of respective symmetry substantially exactly opposite to and paralleling prismatic ribs through the thickness of the glass.

OTIS A. MYGATT.

Witnesses:
ROBERT KELLY, Jr.,
WM. J. CADY.